H. H. YOUNG.
MOVABLE FOOT RAIL.
APPLICATION FILED JUNE 6, 1918.

1,311,940.

Patented Aug. 5, 1919.

Witness
Samuel S. Matthes

Inventor
Hugo H. Young
By
John N Orr
his Attorney

UNITED STATES PATENT OFFICE.

HUGO H. YOUNG, OF LOUDONVILLE, OHIO.

MOVABLE FOOT-RAIL.

1,311,940.  Specification of Letters Patent.  Patented Aug. 5, 1919.

Application filed June 6, 1918. Serial No. 238,575.

*To all whom it may concern:*

Be it known that I, HUGO H. YOUNG, a citizen of the United States of America, residing at Loudonville, in the county of Ashland and State of Ohio, have invented certain new and useful Improvements in Movable Foot-Rails, of which the following is a specification.

This invention relates to a movable footrail for cars and carriages or the like.

The primary object of the present invention is to construct a pivoted or movable footrail so as to provide means of changing the relative position of the footrail with respect to the occupant of a vehicle or the like, to accommodate and conform to the different reaches of the occupants of the vehicle thereby insuring comfort and ease to the occupants in riding by affording facilities for changing the relative distance of the footrail from the occupants of the vehicle.

A further object is to provide means of securely, but yieldingly locking the footrail in its adjusted or in its relatively changed position with respect to the occupants of the vehicle, this function being automatically performed when the footrail is manipulated to change its relative position with respect to its distance from the occupants of the vehicle.

These and other objects are attained by the mechanism illustrated in the accompanying drawing in which.

Figure 1:
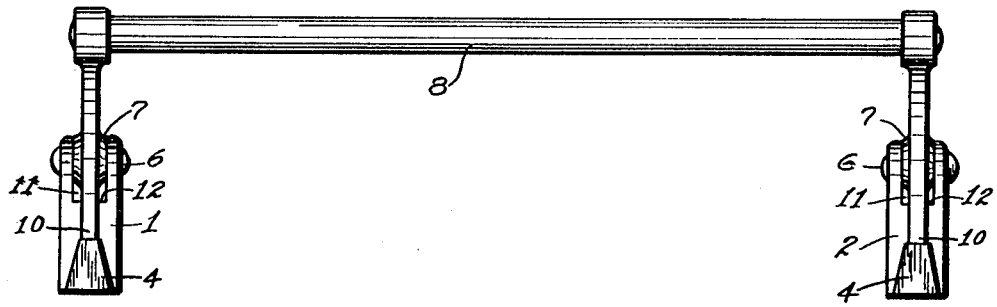
Figure 1 is an elevation of the invention showing the footrail in neutral position.
Figure 2:
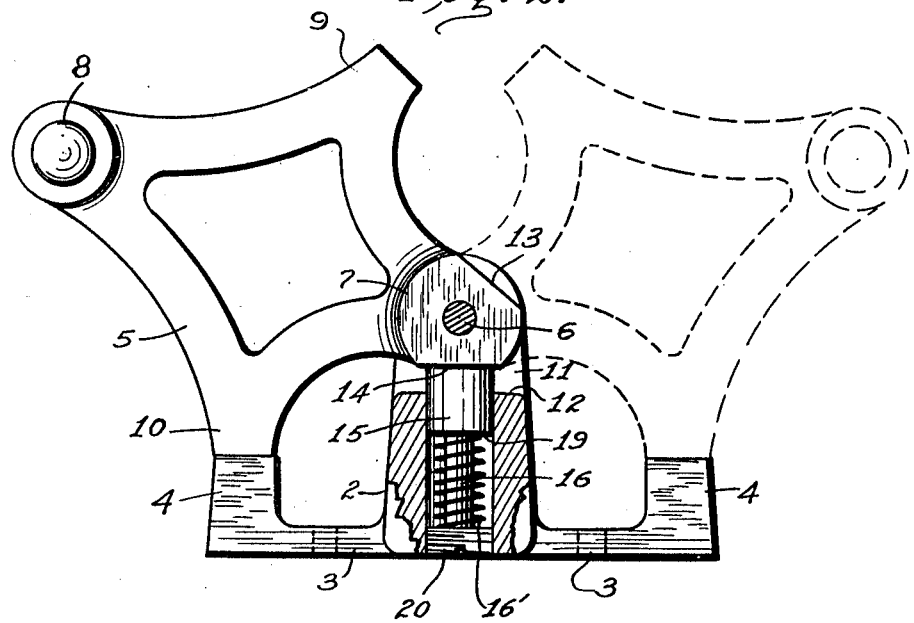
Fig. 2 is a side elevation of the invention showing one of the standards partly in section.

In the drawings reference numerals 1 and 2 represent bifurcated standards which are preferably provided with oppositely disposed projecting portions 3. Supporting lugs 4 are provided on the projecting portions 3. Lever brackets 5 are fitted to the bifurcated portions of the standards and mounted to pivot upon pins 6 which are secured to the standards and pass through the hubs 7 of the pivoted lever brackets. A rod 8 is connected and rigidly secured to the pivoted lever brackets 5 thereby providing a movable footrail or rest.

The lever brackets 5 are provided with oppositely extending arms 9 and 10 having the ends thereof flattened, arranged and adapted to contact or abut against and rest upon the supporting lugs 4 on either side of the standards when the footrail is manipulated and thus adjusted to a relatively shorter or longer distance from the occupants of the vehicle.

In order to securely but yieldingly lock the lever brackets and rail in the desired relative positions with respect to the occupants of the vehicle, a spring press locking mechanism is provided and mounted upon the standards to wit; the brackets are mounted to pivot upon the bifurcated portions of the standards so as to leave spaces 11 between the peripheries of the hubs of the pivoted lever brackets and the bottoms 12 of the bifurcated portions of the standards. The hubs 7 of the brackets are preferably flattened as indicated at 13 and 14. Suitable apertures are formed under the hubs 7 in the bottoms 12 of the bifurcated portions of the standards to receive the studs 15 which are provided with reduced portions 16 and loosely fitted in said apertures.

Springs 16' are fitted to the reduced portions of the studs and are adapted to contact with shoulders 19 of the studs at one end. Threaded plugs 20 threadably engage the threaded portions of the apertures and the ends thereof are adapted to contact with the opposite ends of the springs and compress the same so as to force the springs to exert more or less tension as desired against the shoulders of the locking studs forcing the ends of the studs in yielding contact with the peripheries of the hubs of the pivoted lever brackets when the brackets are in neutral position and forcing the studs in contact with the flattened portions of the pivoted lever brackets when the brackets are manipulated or adjusted to change the distance of the footrail from the occupants of the vehicle.

When the footrail is moved to either its forward or rearward position and the arms forced in contact with the supporting lugs of the standards, the ends of the yielding locking studs automatically exert a pressure against the flattened portions of the hubs of the pivoted lever brackets thereby locking the brackets and rail to the supporting lugs of the standards securely, but yieldingly in their adjusted or changed position and also counteracting the vibration or jarring of the parts of the rail mechanism transmitted thereto from a moving vehicle.

Attention is called to the fact that in order to change the position of the footrail that it is only necessary to impart pressure upon the footrail forcing it in the direction desired until the ends of the arms contact with the supporting lugs at which point the rail and brackets are yieldingly and automatically locked to the lugs by the spring pressed mechanism.

I claim:

1. In a pivoted footrail, standards provided with lugs, lever brackets pivoted thereto having hubs with opposed portions thereof flattened, a rod connected to said lever brackets, spring pressed means mounted upon the standards and adapted to contact with the flattened portions of the hubs to yieldingly lock the pivoted lever brackets to the lugs of the standards.

2. In a movable footrest, standards provided with supporting lugs, lever brackets pivoted to the standards having diametrically opposed flattened portions, said hubs being also provided with oppositely disposed arms, a rail connected to the lever brackets, and spring pressed means mounted on the standards and adapted when the brackets are moved to a predetermined point to yieldingly lock the arms of the brackets to the supporting lugs of the standards as described and set forth.

3. In a footrail the combination of standards having lever brackets pivoted thereto, a footrail connected to the pivoted lever brackets, lugs formed on the standards, arms provided on the pivoted lever brackets and oppositely disposed, said arms and lugs being coöperative to maintain and support the footrail at different distances from a predetermined point, a spring pressed means associated with the brackets which when manipulated automatically but yieldingly locks the footrail and brackets in their adjusted positions.

4. In a movable footrail, standards, a footrail, brackets carrying the footrail and pivotally mounted in the standards, means to limit the movement of the brackets to position the footrail at either of two substantially opposed positions, and means to yieldingly lock the brackets relative to the standards in such positions.

5. In a movable footrail, a support in which the footrail is mounted for swinging in an arc to a limit of substantially opposed positions, and means for yieldingly locking the footrail in either of such positions.

In testimony whereof I affix my signature.

HUGO H. YOUNG.